United States Patent [19]

Hashizume

[11] Patent Number: 4,743,819
[45] Date of Patent: May 10, 1988

[54] INDUSTRIAL ROBOT

[75] Inventor: Junji Hashizume, Yokohama, Japan

[73] Assignee: Tokico Ltd., Kawasaki, Japan

[21] Appl. No.: 915,542

[22] Filed: Oct. 6, 1986

[30] Foreign Application Priority Data

Oct. 18, 1985 [JP] Japan .................................. 60-232773

[51] Int. Cl.$^4$ ............................................. G05B 19/42
[52] U.S. Cl. ...................................... 318/368; 384/513
[58] Field of Search ........................... 318/368 C, 368; 364/513

[56] References Cited

U.S. PATENT DOCUMENTS

4,328,050  5/1982  Ashizawa et al. ............... 318/568 X
4,385,358  5/1983  Ito et al. ................................. 364/513

Primary Examiner—William M. Shoop, Jr.
Assistant Examiner—Saul M. Bergmann
Attorney, Agent, or Firm—Nixon & Vanderhye

[57] ABSTRACT

An industrial robot comprising an industrial robot main body, detectors for detecting a relative position between movable members of the robot main body, a designation circuit for designating position signals from the detectors upon a teaching operation, memory for sequentially storing the position signals designated by the designation circuit, digital interpolation circuits for executing interpolation based on at least four read out position signals from the memory in order to determine the required number of desired positions on an area delineated by lines joining points corresponding to the four position signals, and servo circuits for positioning each of the movable members of the robot main body while using a calculation result signal from the digital interpolation circuits and the position signals from the detectors upon a playback operation.

6 Claims, 5 Drawing Sheets

INDUSTRIAL ROBOT

BACKGROUND OF THE INVENTION

1. Field of the Invention

This invention concerns an industrial robot and, particularly, it relates to a so-called teaching-playback type industrial robot.

2. Description of the Prior Art

A linear interpolation type teaching-playback type industrial robot is known. In the case of conducting, for example, a coating operation by the industrial robot of this type, the top end of an industrial robot main body having an injection nozzle is first moved over the entire surface to be worked by an operator so as to simulate a coating operation for an object to be coated and, at the same time, the contents of the simulated operation, which are issued at a predetermined interval in distance, are stored into a memory device (generally referred to as point-to-point (PTP) teaching operation). Then, after all of the operation contents have been stored, the coating operation is repeated automatically again by reading out the stored data for the operation contents in two positions spaced by the predetermined distance and additionally preparing position data by dividing the interval between the two position data linearly into a predetermined number with the thus read out two position data, that is, the coating operation is carried out accompanying the linear interpolation operation (generally referred to as playback operation).

U.S. Pat. Nos. 4,385,358 and 4,420,812 are referred to, for example, as publications showing such technics in the prior art.

If the contents of the workings in the predetermined working positions on the worked surface are sequentially stored in the memory device upon a teaching operation in the industrial robot, the teaching operation is required to be executed in order to cover the surface to be worked while repeating the linear reciprocal movement over the entire surface to be worked, which results in the increase in the amount of time required to perform the teaching operation and, in addition, increases the physical burden of the operator. Further, the correction for a portion of the contents of the working taught to the robot is carried out by conducting the similar teaching operation again and storing all of the contents of the working including the partial correction again to the memory device. Accordingly, the teaching-playback type industrial robot of a linear interpolation type in the prior art is not always efficient in its operation.

Furthermore, in the coating or like other working, it is, for instance, necessary linear loci be drawn in the longitudinal and lateral directions during the teaching operation so as to eliminate uneven coating on an identical surface to be worked thereby requiring a greater amount of working time and thus increasing the operator's burden.

OBJECT OF THE INVENTION

This invention has object thereof, is to provide an industrial robot capable of conducting the working operation to a surface to be worked by merely conducting a simple teaching operation and, further, effecting by a partial correction easily to the working operation once it is taught to the robot.

SUMMARY OF THE INVENTION

The foregoing object can be attained by an industrial robot according to this invention comprising:

an industrial robot main body having a plurality of movable members connected with their respective joints;

a detection means for detecting a relative position between the movable members at each of the joints;

a designation circuit for designating position signals from the detection means upon teaching operation;

memory means for sequentially storing the position signals designated by the designation circuit;

a digital interpolation means for conducting interpolation based on at least four read out position signals from said memory means in order to determine a required number of desired positions on a plane surrounded with points corresponding to said four position signals; and servo means for positioning each of the movable members of the industrial robot main body while using a calculation result signal from the digital interpolation means as aimed values and position signals from the detection means as current values.

BRIEF DESCRIPTION OF THE ACCOMPANYING DRAWINGS

These and other objects, as well as the features of this invention will become apparent by reading the following descriptions for preferred embodiments according to this invention referring to the accompanying drawings, wherein.

DESCRIPTION OF THE PREFERRED EMBODIMENTS

Figure 1:
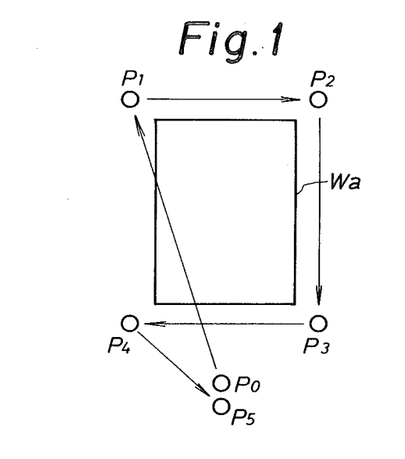
FIG. 1 is an explanatory view for the teaching operation in the plane interpolating operation.

The industrial robot according to this invention is so constituted as teaching four positions, for instance, in the order of points P1, P2, P3 and P4 that define the area Wa to be worked as shown in FIG. 1, further teaching, in addition to at least 4 position data, the number of reciprocations of a working member such as a coating nozzle on the area to be worked, i.e., the number of passes, the number of interpolation positions on the pass and the number of scanning patterns, i.e., the number of interpolations carried out on the aera (usually conducted while varying the direction of the reciprocal movement) as numerical parameters, and executing the digital interpolation for the area to be worked based on these at least 4 position data, the number of passes of the working member, the number of interpolation on the passes and the number of scanning patterns.

This invention will now be described by way of preferred embodiments according to the drawings.

In the drawings, an industrial robot main body 1 comprises wrist 2 as a movable member, arm 3 and support 4 and base 5, in which the wrist 2 is connected to the arm 3 by way of joints 6a and 6b such that the wrist 2 is rotatable relative to the arm 3 within the range of an angle A in a vertical plane, as well as rotatable within the range of an angle B in a plane perpendicular to the vertical plane. The arm 3 is connected to the support 4 by way of joint 7, while the support 4 is connected to the base 5 by way of joint 8, in which the arm 3 is rotatable relative to the support 4 within the range of an angle C in a vertical plane and the support 4 is rotatable relative to the base 5 within the range of an angle D in a vertical plane, as well as rotatable within the range of an angle E in a plane perpendicular to the vertical plane. The arm 3 is disposed with hydraulic pressure driving devices 9 and 10 for rotating the wrist 2 relative to the arm 3 within the range of the angle A and the angle B, hydraulic pressure driving device 11 is disposed between the arm 3 and the support 4 for rotating the arm 3 relative to the support 4 within the range of the angle C and hydraulic pressure driving devices 12 and 13 are disposed to the support 4 and the base 5 respectively for rotating the support 4 relative to the base 5 within the range of the angle D and angle E. Potentiometers 14 and 15 are disposed to the joints 6a and 6b respectively for detecting the rotational position of the wrist 2 relative to the arm 3 within the range of the angle A and the angle B, potentiometer 16 is disposed to the joint 7 for detecting the rotating position of the arm 3 relative to the support 4 within the range of the angle C, and potentiometers 17 and 18 are disposed to the joint 8 for detecting the rotating position of the support 4 relative to the base 5 within the range of the angle D and the angle E. Further, a handle 19 is detachably disposed to the wrist 2. The handle 19 is attached to the wrist 2 upon teaching operation and detached from the wrist 2 upon playback operation. Respective position signals from the potentiometers 14–18 are supplied to an input circuit 21 diposed in control board 20 and the respective position signals from the potentiometers 14–18 are amplified to a predetermined level in the input circuit 21. The respective signals from the potentiometers 14–18 inputted to the input circuit 21 are supplied to a selection circuit or analog multiplexer 26. The potentiometers 14, 15, 16, 17 and 18 and the input circuit 21 constitute detection means.

The selection circuit 26 sequentially selects the positional signals supplied from each of the potentiometers based on control signals delivered from a control circuit 27 upon teaching operation and supplies the selected position signals to A/D converter 28. The control circuit is readily embodied, for example, as a pre-programmed controller or microprocessor such as model 8085 manufactured by Intel Corporation, wherein the controller or microprocessor is equiped with an additional device.

The A/D converter 28 converts the position signals as analog signals into digital signals and outputs the thus converted digital signals to circuit 29 for the control of signal transfer. The signal transfer control circuit 29 supplies the position signals supplied from the A/D converter 28 to a memory device 30 by the aid of the control signal from the control circuit 27 upon teaching operation, while supplying positional data signals, scanning pattern number signals, pass number signals, interpolation surface number signals and injection start/stop signals read out from the memory device 30 described later to registers 32, 33, 22, 23 and 59 under the aid of the control signal from the control circuit 27 upon playback operation. Upon teaching operation, the memory device 30 stores the position signal supplied from the A/D converter 28 through the circuit 29 for control of signal transfer, interpolation number signals supplied from interpolation number setter 35 disposed to a corrector 34, pass number signals and interpolation surface number signals inputted from key board 25 disposed to operation panel 40 and coating injection start/stop signals from switch 58 disposed to the handle 19 respectively by the aid of address signals from the control circuit 27 at the respective teaching positions Pi sequentially. A switch 37 as a designation circuit for designating the teaching position Pi to the object to be coated W upon teaching operation is disposed to the handle 19 and the actuation signal from the switch 37 is supplied to the control circuit 27. The control circuit 27 supplies the control signal to the selection circuit 26 and the memory device 30 under the control of the actuation signal from the switch 37. It is so adapted that the number of actuation of the switch 37 is counted in counter circuit 38 and the value counted in the counter circuit 38 is supplied to numerical display 39 disposed on the corrector 34 and numerical display 41 disposed on the operation panel 40 of the control board 20. The numerical displays 39 and 41 indicate, in decimal number, the counted values in the counter circuit 38 respectively. Further, the counter circuit 38 increases its counted content each by one by the pulse from the control circuit 27 generated on every reading of the positional data signal relative to the teaching position Pi, the interpolation number signal, the pass number signal, the scanning pattern number signal and the injection start/stop signal upon playback operation. That is, the counter circuit 38 counts, upon playback operation, the number of readings for the data block comprising the position signals in the number corresponding to the number of the potentiometers 11–18 indicating a working point, one interpolation number signal, pass number signal, scanning pattern number signal and injection start/stop signal. The operation panel 40 is disposed with the key board 25 for inputting the pass number and the scanning pattern number, hydraulic pressure source actuation switch 42, teaching/play-back mode change-over switch 43, start switch 44, stop switch 45 and operation speed setter 46 composed of a variable resister. ON-OFF actuation of the switch 42 defines the operation of the hydraulic pressure source 47 such that the control circuit 27 starts the operation of a pump for the hydraulic pressure source 47 when the switch 42 is set to ON, while the control circuit 27 stops the operation of the pump for the hydraulic pressure source 47 when the switch 42 is set to OFF. The ON/OFF signal of the switch 43 is supplied to the control circuit 27 and the control circuit 27 is set to the teaching operation or the playback operation depending on the ON or OFF signal from the switch 43, in which it generates a control signal required for the teaching operation when set to the teaching operation mode, while generates a control signal required for the playback operation when set to the playback operation mode. The set signal from the operation speed setter 46 is supplied through the control circuit 27 to pulse generator 48. The generator 48 generates a series of pulses having a certain period while being synchronized with the control operation of the control circuit 27 upon playback operation. The pulses generated from the generator 48 are supplied to counter circuit 49 and digital interpolation circuit 50. The counter circuit 49 counts the pulses supplied from the generator 48 and supplies the counted value to a digital interpolation circuit 50 and comparison circuit 51 and the digital interpolation circuit 50 conducts digital interpolation using the signals supplied from registers 31, 22, 23, 32 and 33, the pulse generator 48 and the counter circuit 49 under the control of the control circuit 27. The comparison circuit 51 compares the interpolation number signal loaded in the register 33 with the counted value of the counter circuit 49 and, if no difference is detected in the comparison, outputs a zero detection signal to the control circuit 27. In this case, position signals are loaded in the registers 31 and 32, while the interpolation number signal is loaded in the register 33 upon playback operation. The digital interpolation circuit 50 executes a linear interpolation between the teaching positions Pi and P(i+1) to determine the value thereof from each of the values Xai-Xei for the position signals at the $i_{th}$ teaching position Pi from the register 31, each of the values Xa(i+1)-Xe(i+1) for the position signals at the $(i+1)_{th}$ teaching position P(i+1) from the register 32, the value N(i+1) for the $(i+1)_{th}$ interpolation number signal from the register 33 and the counted value Cp from the counter circuit 49. That is, the digital interpolation circuit 50 executes the following calculation so as to determine the value Xar regarding the range of the angle A at the interpolation position between the positions Pi and P(i+1) on every occurrence of pulses from the generator 58, based on the value Xai for the position signal from the register 31, the value Xa(i+1) for the position signal from the register 32, the value N(i+1) for the interpolating number signal from the register 33 and the counted value from the counter circuit 49:

$$Aar = Xai + \frac{\{Xa(i + 1) - Xai\}}{N(i + 1)} Cp.$$

The digital interpolation circuit 50 outputs the calculation result signal to D/A converter 52. The digital interpolation is executed by a known binary digital operation. The D/A converter 52 converts the supplied calculation result signal as the digital signal into an analog signal and supplies the analog signal to analog memory circuit 53 to retain the signal till the occurrence of the next calculation result signal. The digital interpolation circuit 50, D/A converter 52 and analog memory circuit 53 constitute digital interpolation means. The digital interpolation means is disposed each by one corresponding to the position control within the angle A for the wrist 2, the position control within the angle B for the wrist 2, the position control within the angle C for the arm 3, the position control within the angle D for the support 4 and the position control within the angle E for the support 4. Instead of the analog memory circuit 53, a register may be disposed between the digital interpolation circuit 50 and the D/A converter 52 to store the calculation result signal as a digital signal and hold the stored signal till the occurrence of the next calculation result signal. The calculation result signals supplied to the analog memory circuit 53 are supplied respectively as aimed values to a comparator 54 of the servo circuit. The comparator 54 compares the position signal as a current value supplied from the potentiometers 11-18 through the input circuit 21 with the position signal as the target value from the memory circuit 53 upon playback operation and supplies the difference signal as the result of the comparison to each of the servo amplifiers 55. The amplifier 55 properly amplifies the thus supplied difference signal and supplies the thus amplified difference signal to servo valve 56. The servo valve 56 controls the charge and discharge of the hydraulic pressure from the hydraulic pressure source 47 to the hydraulic pressure driving device 9 based on the thus supplied difference signal. In this way, the potentiometer 14, the input circuit 21, the comparator 54, the amplifier 55, the valve 56 and the driving device 9 constitute a servo circuit as servo means regarding the position control, for example, of the wrist 2 within the angle A, and the position of the wrist 2 as the movable member is set to the target values inputted sequentially to the comparator 54. The servo circuits are constituted in a similar manner also to other position controls of the movable member. In the case of application of the robot to a coating use, the wrist 2 is provided with paint injection nozzle 57 and switch 58 for designating the start/stop of the coating injection from the nozzle 57 is disposed to the handle 18. The coating injection start/stop signal generated from the switch 58 upon teaching operation is stored through the control circuit 27 to the memory device 30. While on the other hand, the injection start/stop signal stored in the memory device 30 is read out therefrom to the register 59 upon playback operation and used as the control signal to coating injection driving device 60. Further, the keyboard 25 is disposed to the operation panel 40, and the pass number and the scanning pattern number are inputted from the key board 25 and stored through the control circuit 27 to the memory device 30 upon teaching operation. The registers 22, 23, 31, 32, 33 and 59, the selection circuit 26, the control circuit 27, the A/D converter 29, the circuit 29 for control of signal transfer, the memory device 30 and the counter circuit 38 constitute memory means.

The operation of the thus constructed industrial robot will be explained below. Upon teaching operation, the switch 42 is set to OFF state and the operation of the pump for the hydraulic pressure source 47 is stopped. When the operation of the pump for the hydraulic pressure source 47 is stopped, generation of the hydraulic pressure from the hydraulic pressure source 47 is stopped and each of the movable members is now freely rotatable. Then, the switch 43 is manipulated to output an ON signal to the control circuit 27 so as to operate the control circuit 27 in the teaching mode. After setting to the teaching operation mode, when the start switch 44 is manipulated, the control circuit 27 supplies a reset pulse to the counter circuit 38 such that numeral "0" is indicated on the displays 39 and 41. Then, the handle 19 is manipulated relative to the object W to displace the nozzle 57 to the initial position $P_0$ and, thereafter, the switch 37 is manipulated once. While it is explained in this embodiment that the teaching operation is conducted to a stationary object W, the teaching operation can also be conducted, for example, to a moving object W. Position signals outputted from the potentiometers 14-18 at the position $P_0$ by the actuation of the switch 37 are respectively stored in the memory device 30. That is, the control circuit 27, upon receiving the actuation signal from the switch 37, at first outputs a control signal to the selection circuit 26 to control the selection circuit 26 so as to supply the position signals from the potentiometers 14–18 sequentially to the A/D converter 28, supplies a control signal to the circuit 29 for the control of signal transfer to thereby control the control circuit 29 so as to transfer the position signal as the digital signal from the A/D converter 28 to the memory device 30 and, further, delivers an address signal to the memory circuit 30 to thereby cause position signals sent from the circuit 29 for the control of signal transfer to be stored sequentially to the designated memory addresses as, for example, the position signal from the potentiometer 14 into the first address, the position signal from the potentiometer 15 into the second address, and so on successively, till the position signal from the potentiometer 18 into the fifth address. In the case of the teaching operation at the position $P_0$, if the switch 58 is not manipulated, the control switch 27 writes the injection stop signal into the sixth address in the memory device 30. Further, the control circuit 27 stores the interpolation number signal set in the interpolation number setter 35 into the seventh address of the memory device 30. The interpolation number setter 35 comprises a digital switch having decimal display and can optionally set the values, for example, from 2 to 40 as the value N for the interpolation number signal and the set values is converted into a binary number and stored as the interpolation number signal to the memory device 30 under the control of the control device 27. As described above, since the counter circuit 38 is constituted so as to count the number of actuation for the switch 37 after the manipulation of the switch 44, the displays 39 and 41 for indicating the counted values in the counter circuit 38 display "1" after the teaching operation to the position $P_0$. Then, when the handle 19 is manipulated and the nozzle 57 is displaced to the second teaching position $P_1$ and then the switch 37 is manipulated again, position signals from the potentiometers 14–18 at the position $P_1$ are successively stored in the memory device 30 in the same manner as described above and, at the same time, the interpolation number signal set by the interpolation number setter 35 is stored in the memory device 30. In the case of starting the injection of the coating paint by the nozzle 57 to the object W from the position $P_1$, the switch 58 is actuated, by which the injection start signal is stored in the memory device 30. Further, in the same manner as described above, the counted value in the counter circuit 38 is increased by one after the teaching operation to the position $P_1$ and thus the value indicated on each of the displays 39 and 41 is "2". The procedures are conducted similarly hereinafter and, as the nozzle 57 is diplaced to the positions $P_2$,—, $P_i$, $P_{(i+1)}$,—$P_n$, and when the switches 37 and 58 are actuated, the position signal obtained from the potentiometers 14–18 at the respective positions, the interpolation number signal set by the interpolation number setter 35 and the injection start/stop signal are stored in the memory device 30. After the completion of the teaching operation to the last position $P_n$, when the stop switch 45 is actuated, the control circuit 27 writes an operation end signal into the address next to the address where the last signal has been stored and writes the number (n+1) for the teaching position into the address "0".

Accordingly, for conducting the teaching operation for the digital area interpolation to the surface to be worked Wa, an operator at first teaches the positions for the points $P_1$, $P_2$, $P_3$ and $P_4$ to be worked Wa on the object W as shown in FIG. 1. $P_0$ is the start point and $P_5$ is a stand-by position. The teaching operation regarding the points $P_0$–$P_5$ are carried out in the same manner as those for $P_1$,—$P_{(i+1)}$ as described above respectively and the results are stored in the memory device 30 respectively.

Figure 2:
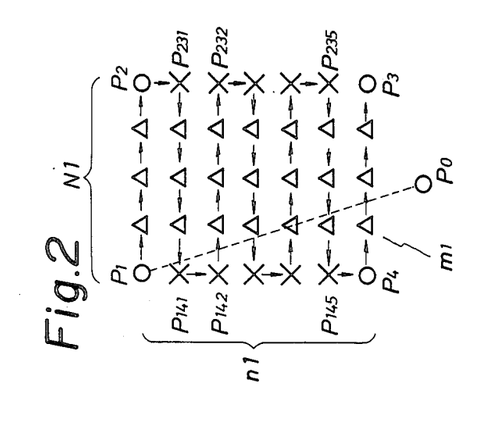
FIG. 2 is a chart showing the method of determining interpolation positions in the plane interpolating operation.
Figure 3:
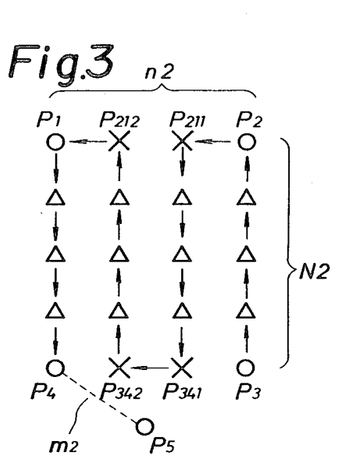
FIG. 3 is a chart showing another method of determining the interpolation positions in the plane interpolating operation.
Figure 4:
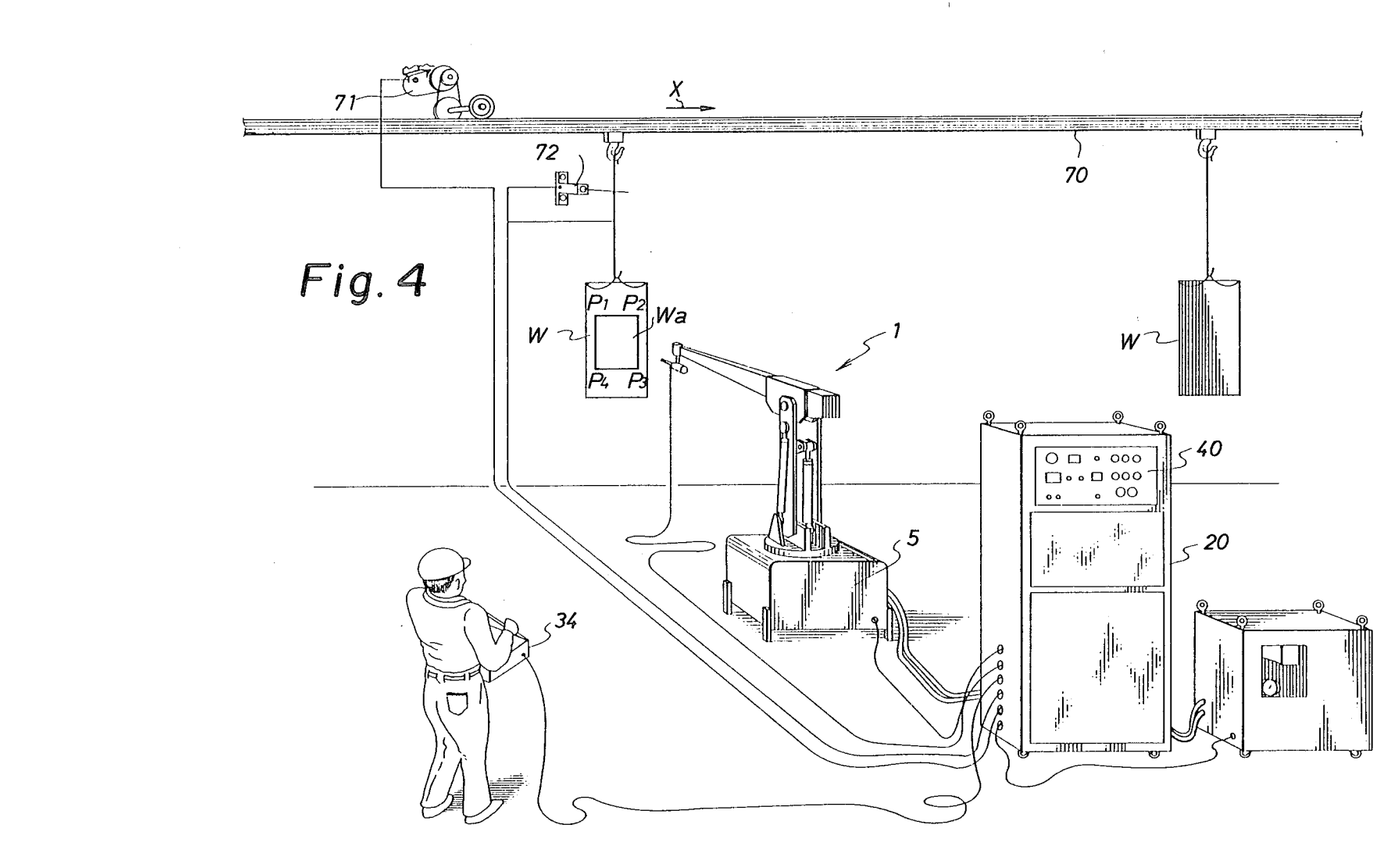
FIG. 4 is an explanatory view for a preferred embodiment according to this invention.
Figures 5, 6:
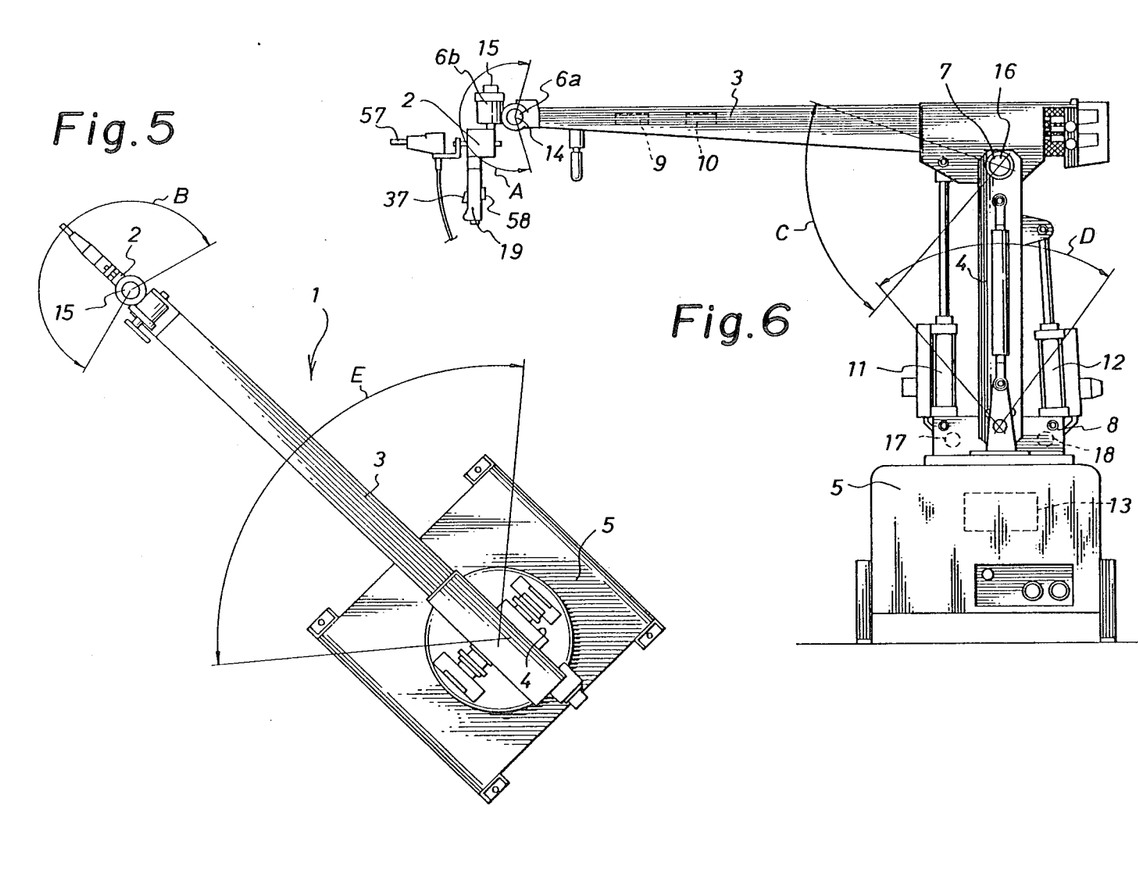
FIG. 5 is a plane view for the industrial robot main body shown in FIG. 4.
FIG. 6 is a side elevational view for the industrial robot main body shown in FIG. 4.
Figure 7A:
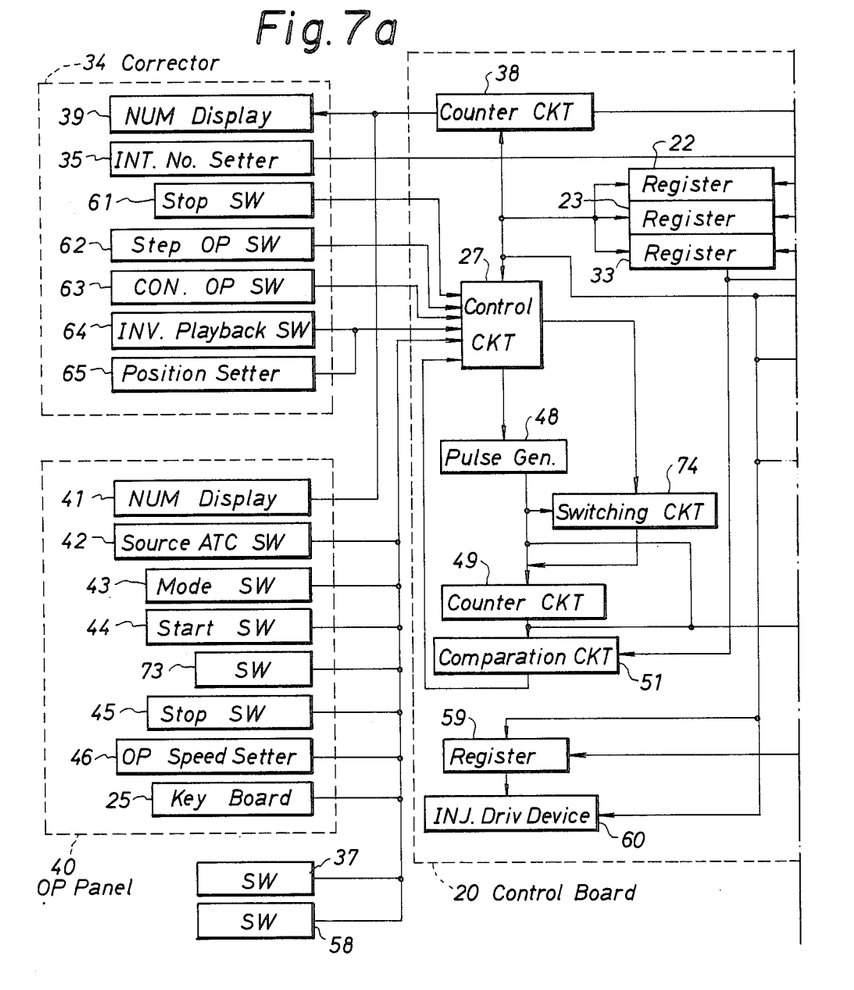
FIGS. 7a and 7b are diagrams for electrical and hydraulic systems in the embodiment shown in FIG. 4.
Figure 7B:
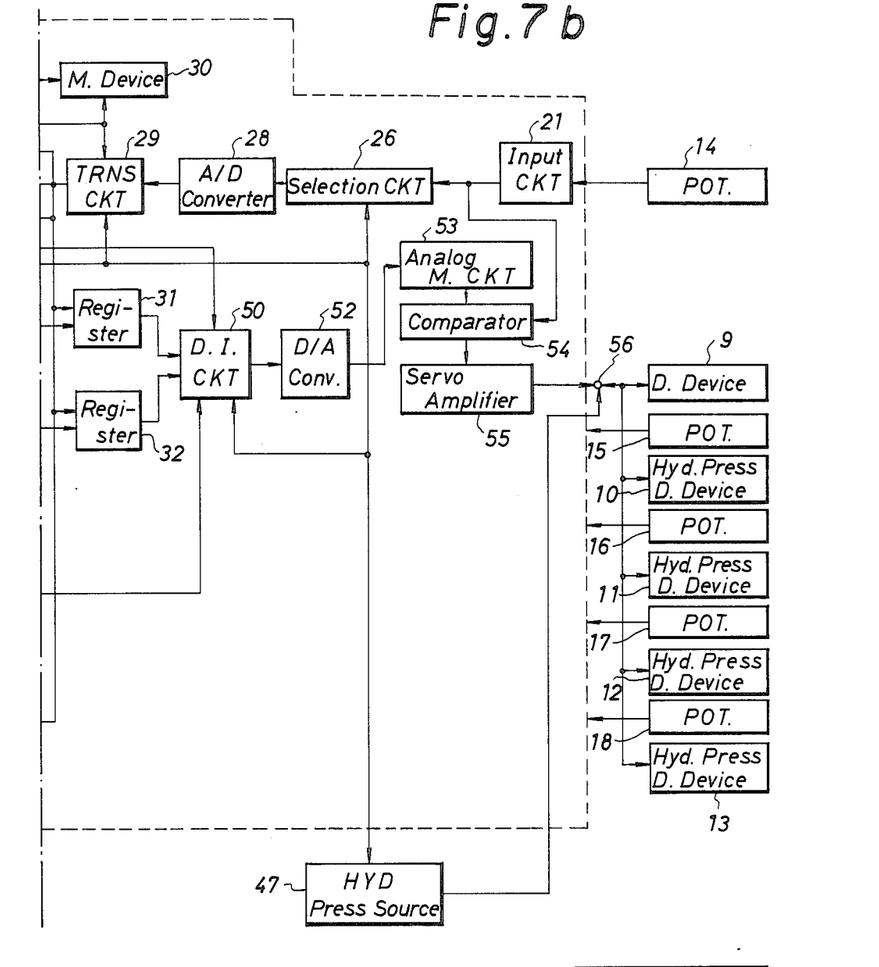
Figure 8:
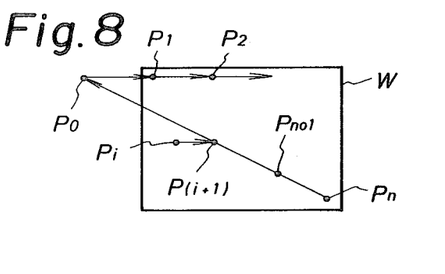
FIG. 8 is an explanatory view showing the state of the teaching positions.

At the same time, a locus moving from the point $P_1$ to the point $P_2$ on the area to be worked Wa on the object W, that is, lateral pass number $n_1$ and the scanning pattern number $m_1$ as shown in FIG. 2 are set. Then, the pass number $n_2$ and the scanning pattern number $m_2$ are set in the same manner as described above in the moving direction of the coating nozzle 57 as shown in FIG. 3, that is, in the longitudinal direction in perpendicular to the moving direction in FIG. 2 by means of the keyboard 25 on the operation panel 40. This is referred to as the setting for the second surface relative to the setting for the first surface in FIG. 2. In the teaching for the second surface shown in FIG. 3, the pass is a longitudinal pass and the longitudinal pass number is set as $n_2$. The number of scanning patterns such as the first scanning pattern and the second scanning pattern is selected depending on the purpose of the working and the lateral pass and the longitudinal pass are conducted alternately. Each of the thus set parameters is stored through the control circuit 27 to the memory device 30.

In the case of conducting the playback operation after the teaching operation as described above, the switch 42 is actuated at first to be set to the ON state. The control circuit 27, upon receiving the ON signal from the switch 42, outputs a control signal for actuating the pump for the hydraulic pressure source 47. When the pump for the hydraulic pressure source 47 is actuated, a hydraulic pressure is generated from the hydraulic pressure souce 47 and supplied to the valve 56. Then, the switch 43 is actuated and the control circuit 27 is set to the playback operation mode. Then, when the start switch 44 is manipulated, the control circuit 27 starts the control for the playback operation. At first, the control circuit 27 delivers a reset signal to the counter circuit 38, upon receiving the operation signal from the switch 44, to clear the counted value in the counter circuit 38 and, at the same time, delivers a control signal for specifying the read out of the position signals stored at the teaching position $P_0$, the interpolation number signal, the injection start/stop signal, the pass number signal and the scanning pattern number signal to the memory circuit 30, reads out these signals from the circuit 30 and supplies the control signal to the signal transfer control circuit 29 and each of the registers 32, 33, 59, 22 and 23 such that the respective read out signals are loaded in the corresponding registers. Simultaneously, the control circuit 27 outputs control signal to the registers 32 and 31 so that the position signals previously loaded in the register 32 is loaded in the register 31. The value of the position signal previously loaded in the register 32 is binary "0" in the case where the control circuit 27 is adapted so as to clear the contents in the registers 31, 32, etc. directly upon receiving the start signal from the switch 44. However, for the simplicity of the explanation, it is assumed that the value Xan (the suffix a means the data regarding the wrist) for the position signal obtained at the teaching position $P_n$ is previously loaded in the register 32. Accordingly, there are loaded the value Xan for the position signal in the register 31, the value $X_{a0}$ for the position signal obtained at the position $P_0$ in the register 32, the pass number n in the register 22, the scanning pattern number m in the register 23, the number $N_0$ for the interpolation number signal in the register 33 and the injection stop signal in the register 59 respectively. When the values are loaded to the respective registers, the control circuit 27 supplies a pulse generation start signal to the pulse generation circuit 48. Then, the pulse generator 48 generates one shot of pulse. The generated pulse is supplied to the digital interpolation circuit 50 and the counter circuit 49 and the counted value in the counter circuit 49 is set to 1. The digital interpolation circuit 50 executes digital interpolation while being synchronized with the pulse from the generator 48. In this case, since "1" is supplied as the counted value Cp from the counter circuit 49 to the digital interpolation circuit 50, the digital interpolation circuit 50 executes, for example, the following calculation:

$$Xan + \frac{X_{a0} - Xan}{N_0} \times 1$$

The calculated result is outputted to the D/A converter 52.

The D/A converter 52 converts the value for the calculated result into an analog signal and outputs the signal into the analog memory circuit 53. The analog signal supplied to the analog memory circuit 53 is supplied as a target value to the comparator 54. The comparator 54 compares the position signal from the analog memory circuit 53 with the current position signal from the input circuit 21 and outputs a difference signal to the servo amplifier 55. The valve 56 is controlled by the difference signal supplied from the servo amplifier 55. The digital interpolations regarding the movement of the arms 3 and support 4 are also conducted in the same manner and valves for the arm 3 and the support 4 are controlled by the servo circuits for the arm 3 and the support 4. As a result, the hydraulic pressure from the hydraulic pressure source 47 is supplied to each of the driving devices 9–13 such that the nozzle 57 is set about at a calculated position, that is, a position $P_{n01}$ deviated, on the linear line connecting the positions $P_0$ and $P_n$, from the position $P_n$ to the position $P_0$ by about $1/N_0$ of the segment $P_0P_n$ (at the position corresponding to about $\frac{1}{2}$ of the segment $P_0P_n$ in the case where $N_0$ is 2). Then, at the elapse of time T additionally set by the operation speed setter 46 after the generation of the first pulse, one shot of pulse is again generated from the pulse generator 48 to thereby increase the counted value Cp in the counter circuit 49 to "2" and, accordingly, for example, the digital interpolation circuit 50 performs the following calculation while being synchronized with the second shot of pulse from the pulse generator 48:

$$Xan + \frac{X_{a0} - Xan}{N_0} \times 2$$

The calculations are effected in the same manner also to the value $X_{b0}$ for the position signal of the wrist 2 within the angle B, to the value $X_{c0}$ for the position signal of the arm 3 within the angle C, to the value $X_{d0}$ for the position signal of the support 4 within the angle D and to the value $X_{e0}$ for the position signal of the support 4 within the angle E.

The pulse generator 48 generates a series of pulses with a certain period while being synchronized with the control by the control circuit 27 and the pulse period is set to a predetermined value by the setting signal supplied from the operation speed setter 46. For instance, the period of the pulses from the generator 48 can optionally be set from 5 msec to 20 msec by the setter 46.

By the way, in the case of teaching for the position $P_0$, if the value $N_0$ for the interpolation number signal set by the interpolation number setter 35 is, for example, "2", since a binary value corresponding to "2" is loaded in the register 33, the digital interpolation circuit 50 outputs the value $X_{a0}$ for the position signal as the result of the calculation and, on the other hand, the comparison circuit 51 that compares the content of the register 33 with the counted value in the counter circuit 49 detects the coincidence and outputs a coincidence detection signal to the control circuit 27. The value $X_{a0}$ for the position signal from the digital interpolation circuit 50 is converted into an analog signal, stored in the analog memory circuit 53 and supplied as a target value to the servo circuit, by which the nozzle 57 is set to the position $P_0$.

Then, the control circuit 27, upon receiving the coincidence signal from the comparison circuit 51, outputs a reset pulse to the counter circuit 49 for increasing the counted value by 1 in the counter circuit 38 and, on the other hand, outputs a reset pulse to the counter circuit 49 to reduce the counted value to zero in the counter circuit 49. Thus, the displays 39 and 41 indicate numeral "1". Further, the control circuit 27 checks whether the injection start signal is loaded or not in the register 59 and, if the injection start signal is loaded in the register 59, the circuit 27 outputs an operation start signal to the coating injection driving device 60. Since the injection start is not designated at the teaching position $P_0$ and, accordingly, the injection start signal is not loaded in the register 59 in this time point, coating paint is not injected from the nozzle 57. Then, the control circuit 27 delivers a reading control signal to the memory device 30 so as to read out the position signal, interpolation number signal, pass number signal and the scanning pattern number signal and the injection start/stop signal stored at the teaching position $P_1$, as well as supplies a control signal to the circuit 29 for the control of signal transfer and each of the registers 32, 33, 22, 23 and 59 so as to load each of the thus read out signal to each of the registers. Further, the control circuit 27 also supplies a control signal to the registers 31 and 32 so as to transfer the position signal loaded in the register 32 to the register 31. Thus, there are loaded the position signal at the teaching position $P_0$ in the register 31 and the position signal at the teaching position $P_1$ in the register 32 respectively. When the signal has been loaded in each of the registers, the control circuit 27 outputs the pulse generation start signal to the pulse generation circuit 48 in the same manner as described above. The pulse generation start signal is generated at the elapse of the time T after setting to the teaching position $P_0$ and the time T is additionally set variably in the same manner as for the pulse period T for the pulse generation circuit 48 by the operation speed setter 46. The pulse generation circuit 48, upon receiving the pulse generation start signal, generates one shot of pulse and supplies the pulse to the digital interpolation circuit 50 and the counter circuit 49. The digital interpolation circuit 50 executes the same calculation as described above upon receiving one shot of pulse, and outputs the respective calculation results to the D/A converter 52. That is, the circuit executes the following calculation based on the counted value Cp in the counter circuit 49:

$$X_{a0} + \frac{X_{a1} - X_{a0}}{N_1} C_p$$

In the case of the digital interpolation between $P_1$-$P_2$, for instance in FIG. 2, the value N for the interpolation number signal is used for the value of the denominator, while the pass number n is used as the value for the denominator in the case of executing the digital interpolation between $P_1$-$P_4$.

In the same manner, the calculations are executed to the value of the position signal for the wrist 2 within the angle B, to the value for the position signal for the arm 3 within the angle C, to the value of the position signal for the support 4 within the angle D and to the value of the position signal for the support 4 within the angle E.

In the case if the value $N_1$ for the interpolation number signal for the teaching position $P_1$ is set to 20, a position signal is outputted from each of the digital interpolation circuits 50 so that the nozzle 57 is positioned on the straight line connecting the positions $P_0$ and $P_1$ at a position displaced each by about 1/20 of the segment $P_0P_1$ from the position $P_0$ to the position $P_1$, corresponding to every one change of the counted value in the counter circuit 49.

The position signal from the digital interpolation circuit 50 is supplied through the D/A converter 52 and the memory circuit 53 to each of the servo circuits. Each of the servo circuits displaces the nozzle 57 while using the position signal from the memory circuit 53 as the target value and using the position signal from the input circuit 21 as the current value. When the counted value in the counter circuit 49 reaches "20", the comparison circuit 51 outputs a coincidence signal to the control circuit 27, in which the control circuit 27 supplies one shot of pulse to the counter circuit 38 in order to indicate the numeral "2" on the displays 31 and 41 in the same manner as described above, outputs a clear signal to the counter circuit 49 and also outputs the next control signal. Since the injection start signal has been stored in the memory device 30 at the teaching position $P_1$, the injection start signal is loaded in the register 59 and, accordingly, the control circuit 27, after receiving the coincidence signal from the comparison circuit 51, detects the loading of the injection start signal and outputs an operation start signal to the driving device 60. The driving device 60, upon receiving the operation start signal, supplies coating paint to the nozzle 57 and, accordingly, the coating paint is jetted out from the nozzle 57 at the position $P_1$ to apply coating to the object W. The procedures are similar hereinafter, in which the nozzle 57 is sequentially positioned at the positions $P_2$, —, $P_i$, $P_{(i+1)}$, —$P_n$ and, simultaneously, injects the coating paint so as to apply required coating to the object W. After positioning to the position $P_n$, the content in the register 59 is checked and, if the injection stop signal is loaded therein, the control circuit 27 delivers an operation stop signal to the driving device 60. The driving device 60 interrupts the coating supply operation upon receiving the operation stop signal, thereby to stop the injection of the coating paint from the nozzle 57.

The basic operation for the linear interpolation is executed in this way and the scanning operation to the area to be worked Wa is further conducted as described below.

At first, in the first scanning operation, the points $P_0$, $P_1$, $P_2$, $P_3$, $P_4$ and $P_5$ have already been taught as shown in FIG. 2 and stored in the memory device 30. The control device 27 reads out the position data $P_0$ to $P_5$ respectively from the memory device 30 when the start switch 44 is pushed. The digital interpolation circuit 50 calculates the positions for the points $P_{231}$, $P_{232}$, $P_{233}$, $P_{234}$ and $P_{235}$ which are divided on the line connecting $P_2$ and $P_3$ so as to obtain the pass number $n_1$ from the pass number $n_1$, for example, 7 and the scanning pattern number $m_1$, for example, 1 already taught and stored in the memory device 30 in the same manner as the linear interpolation described above and the thus calculated positions are recorded in the memory device 30. In the same manner, the digital interpolation circuit 50 reads out $P_1$, $P_4$ from the memory device 30, calculates the positions of the points $P_{141}$, $P_{142}$, $P_{143}$, $P_{144}$ and $P_{145}$ on the line connecting the points $P_1$ and $P_4$ and the thus calculated positions are recorded in the memory device 30. Then, the circuit calculates, as required, the interpolation points also on the line connecting the points $P_0$ and $P_1$ and they are recorded. Further, it also calculates and records the interpolation points on the line connecting the point $P_1$ and the point $P_2$ based on the interpolation number N already taught. In the same manner, it calculates and records thereafter the interpolation points based on the interpolation number N also on the line connecting point $P_{231}$ and $P_{141}$, on the line connecting the point $P_{142}$ and $P_{232}$, on the line connecting the point $P_{233}$ and $P_{143}$, on the line connecting the point $P_{144}$ and $P_{234}$, on the line connecting the point $P_{235}$ and $P_{145}$ and on the connecting the point $P_4$ and $P_3$. In this way, interpolation points on the area to be worked Wa which is delineated by lines joining the points $P_1$, $P_2$, $P_3$ and $P_4$ can be obtained based on the first pattern of scanning shown in FIG. 2.

In FIG. 2, those points interpolated between two points based on the interpolation number N are represented by the symbol Δ, while the points interpolated between the two points based on the pass number are represented by the symbols X and the moving direction of the nozzle 57 is represented by the arrow (these are the same in FIG. 3).

Then, the interpolation points are determined in an identical area to be worked Wa based on the second pattern of the scanning shown in FIG. 3. As shown in FIG. 3, the operation for the interpolation based on the second pattern is fundamentally the same as the operation shown in FIG. 2. However, since the end point in the operation of the first pattern is at the point $P_3$, the start point for the second pattern is also at the point $P_3$. Then, the pass number $n_2$ is set to 4, while the interpolation number $N_2$ is set to 4.

A series of scanning operations has thus been carried out for the area to be worked Wa. While in the explanation described above, the scanning pattern number is two, that is, scanning according to the first pattern and scanning according to the second pattern were carried out on the identical area to be worked, scanning operation may be conducted according to only the first pattern of the surface interpolation or, on the other hand, scanning may also be conducted on the identical area to be worked according to patterns other than the first and second patterns mentioned above depending on the contents of the working. Then, the control circuit 27 starts the reading for the next position signal, etc. from the memory device 30. Since the operation end signal is written at the address next to the storing address for the position signal, etc. regarding the teaching position $P_n$, the control circuit 27 completes the playback control operation upon detecting the read out of the operation end signal and is set to the stand-by position $P_5$ for detecting the occurrence of the next start signal. The control device 27 confirms, after the detecting the read out of the operation end signal, that the playback operation has been conducted normally by checking the memory content stored at the "0" address of the memory device 30, that is, checking the number $n+1$ for the teaching position and the counted content in the counter circuit 38.

In the playback operation as described above, although the playback operation has been conducted while executing the digital interpolation in both of the cases of the linear interpolating operation and the scanning operation, this invention is no way limited only to these cases but it is possible to previously execute only the digital interpolation based on the obtained teaching data at the time of completion of teaching, store all of the calculated results in the memory device 30, and position the nozzle 57 at the time of the playback operation by merely reading out the position data obtained as the result of the calculation from the memory device 30. In this way, the operation speed of the industrial robot can be increased further.

Further, this invention can be applicable either to an industrial robot which is position-controlled on an angular coordinate system or to an industrial robot which is position-controlled on an orthogonal coordinate system.

By the way, although the foregoing embodiment has been constituted for continuously effecting the playback operation sequentially, this invention no way limited only to such an embodiment. For instance, the industrial robot according to this invention may be so constructed that a temporarily stop switch 61 as a correction device is disposed to a portable corrector 34, the controlling operation of the control circuit 27 is interrupted before reading out the new position signal by manipulating the switch 61 upon playback operation and the position at which nozzle 57 will be positioned after the controlling-operation of the control circuit 27 has been stopped can additionally be taught newly. In this way, if a stop switch 61 is disposed so that the playback control can be interrupted at any optional position, the teaching position can be amended. Further, in the case of deleting a specific teaching position in this amendment, position signals, etc. at the teaching position next to the teaching position to be deleted are stored at each of the addresses in the memory device 30 in which the position signals, etc. relative to the teaching position to be deleted are stored and the position signals at the subsequent teaching positions may be carried up sequentially and stored at each of the addresses in the memory device 30. While on the other hand, in the case of increasing the teaching position, the switch 61 is manipulated at a position prior by one to the position to be increased to stop the playback control of the control circuit 27 and, next, teaching to the position to be increased is conducted in the teaching operation mode and position signals, etc. corresponding to the teaching positions subsequent to the position to be increased may be stored in the respective carried down memory addresses. The point of reading out the accurate teaching position from the memory device 30 upon playback operation can be confirmed by the displays 39 and 41 that display the counted value of the counter circuit 38.

By the provision of the switch 61, each of the teaching positions can be modified and, in addition, the number of teaching positions can be increased or decreased to provide excellent performance for the general-purpose use. Further, it is also possible to store the position signals and the likes only for any optional position in the memory device 30 in the teaching operation and conduct the teaching operations for all of other teaching positions in the correcting operation. Further, a step operation indication switch 62 and a continuous operation indication switch 63 may be disposed to the corrector 34 and the control circuit 27 may be constituted such that, after the operation of the switch 61 in the playback operation, the nozzle 57 is moved stepwise on every teaching position at each operation of the switch 62 or the nozzle 57 may be moved continuously during operation of the switch 63. In addition, a reverse playback indication switch 64 may be disposed so that the playback operation may be conducted reversely, for example, as $P_n$, $P_{n-1}$—$P_2$, $P_1$ by the operation of the switch 64. Further, it may be adapted such that required displacing amount of the nozzle 57 in the vertical and lateral directions can be set by a position setter 65 disposed to the corrector 34 irrespective of the position signals stored in the memory device 30 to move the nozzle 57 based on the set amount of displacement. The industrial robot according to this invention is not limited only to those applicable to the coating use but it is also applicable, for example, to the welding use in which a welding torch is disposed to the industrial robot main body.

Although the explanations have been made for the teaching operation and the playback operation relative to the object to be coated W in a stationary state, in the case of conducting the teaching operation and the playback operation to a moving object to be coated W, it may be so constructed that the control circuit 27 supplies the pulse from pulse generator 71 to switching circuit 74 when the object to be coated W passes through the detector 72 and then the switching circuit 74 outputs the thus supplied pulse to the counter circuit 49, by which the teaching operation and the playback operation can be conducted synchronized with the movement of conveyor 70 in the direction X. Alternately, it may be so adapted that the pulse of the pulse generator 48 is outputted from switching circuit 74 by the operation of switch 73 disposed to the operation panel 40, by which the teaching operation and the playback operation may be conducted not synchronized with the movement of the conveyor 70 in the direction.

As has been described above, according to this invention, since many interpolation positions are determined on the area to be worked by merely teaching for at least four position signals obtained in a discrete manner upon teaching operation on the area to be worked, teaching procedures are not required by so much and, accordingly, the teaching time can be shortened remarkably and the operator's burden can be moderated. Then, since the positioning is conducted based on a plurality of interpolation positions thus obtained, the positioning operation can be conducted smoothly. In addition, since the number of divisions can optionally be set, finer control can be obtained as required.

Further, it is only necessary to conduct teaching for at least four points, only four points have to be taught again and the digital interpolation may be conducted based thereon if the area to be worked is replaced, and accordingly, the working can be carried out with relatively reduced loss time in the re-teaching even for the working in which the areas to be worked are replaced frequently.

Furthermore, since the required modification for the position can simply be conducted by the corrector, the working efficiency can be enhanced and the productivity can be improved remarkably.

What is claimed is:

1. An industrial robot comprising:
   a main body having a plurality of movable members connected to one another at their respective joints,
   detection means for detecting relative positions between the moveable members at each of the joints and for outputting position signals based thereon,
   designation circuit means for designating position signals from the detection means upon a teaching operation,
   memory means for sequentially storing the position signals designated by said designation circuit,
   digital interpolation means for executing an interpolation based on at least four read out position signals from said memory means in order to determine a required number of desired positions on a flat area delineated by lines joining points corresponding to said four position signals and for outputting a calculation result signal based upon said determination;
   servo means for positioning each of said movable members of the robot main body using, during a playback operation, said calculation result signal from said digital interpolation means as target values and said position signals from said detection means as current values, and
   interpolation selection means for variably selecting a number of interpolation positions on said flat area for which an interpolation is to be executed by said digital interpolation means.

2. An industrial robot as in claim 1, wherein said designation circuit means includes a switch on the industrial robot main body and adapted such that operation of said switch designates said position signals outputted by said detection means for storage in said memory means.

3. An industrial robot comprising:
   a main body having a plurality of movable members connected to one another at their respective joints;
   detection means for detecting relative positions between the movable members at each of the joints and for outputting position signals based thereon;
   designation circuit means for designating position signals from the detection means upon a teaching operation;
   memory means for sequentially storing the position signals designated by said designation circuit;
   digital interpolation means for executing an interpolation based on at least four read out position signals from said memory means in order to determine a required number of desired positions on a flat area delineated by lines joining points corresponding to said four position signals and for outputting a calculation result signal based upon said determination;
   servo means for positioning each of said movable members of the robot main body using, during a playback operation, said calculation result signal from said digital interpolation means as target values and said position signals from said detection means as current values;
   pulse generating means for generating pulses in response to said digital interpolation means beginning said interpolation for each of said at least four positions on said flat area; and
   means for variably setting intervals between said pulses generated by said pulse generating means.

4. An industrial robot as in claim 3, wherein said designation circuit means includes a switch on the industrial robot main body and adapted such that operation of said switch designates said position signals outputted by said detection means for storage in said memory means.

5. An industrial robot comprising:
   a plurality of movable members connected to one another at their respective joints;
   first means for detecting relative positions between the movable members at each of the joints;
   second means for designating positions detected by the detection means during a teaching operation,
   third means for setting first and second division numbers;
   fourth means for subsequently storing the positions designated by said first means, and the first and second division numbers supplied from said third means,
   fifth means for executing an interpolation of (i) first interpolated positions between first and second positions read-out from said fourth means based on the first division number which is read-out from the fourth means, (ii) second interpolated positions between second and third positions read-out from said fourth means based on the second division number which is read-out from the fourth means, (iii) third interpolated positions between third and fourth positions read-out from said fourth means based on the read-out first division number, (iv) fourth interpolated positions between the read-out fourth and first positions based on the read-out second division number, and (v) a plurality of fifth interpolated positions between the respective second interpolated positions and the respectively corresponding fourth interpolated positions based on the read-out first division number,
   sixth means for storing said first to fifth interpolated positions, and
   seventh means for reading out the first to fourth positions and the fifth interpolated positions from the fourth and sixth means and for positioning each of the movable members based on positional signals read out from the fourth and sixth means as target values and the positional signals supplied from the detection means as current values upon a playback operation so that a free end of said connected movable members is firstly positioned between the first and second positions through the first interpolated positions, secondly positioned between the third and fourth positions through the third interpolated positions and positioned between the respective second interpolated positions and the respectively corresponding fourth interpolated positions through the corresponding fifth interpolated positions in an interval of said first and second positioning operations.

6. The industrial robot according to claim 5, in which;
   said seventh means is adapted to further position each of the movable members based on positional signals read-out from the fourth and sixth means as target values and the positional signals supplied from the detection means as current values upon a playback operation so that in the further positioning the free end of said connected movable members is firstly positioned between the first and fourth positions through the fourth interpolated positions, secondly positioned between the second and third positions through the second interpolated positions, and positioned between the respective first interpolated positions and the respectively corresponding third interpolated positions through the corresponding fifth interpolated positions in an interval of said further first and second positioning operations.

* * * * *